No. 846,789. PATENTED MAR. 12, 1907.
L. J. GILMAN.
PLOW.
APPLICATION FILED NOV. 9, 1906.
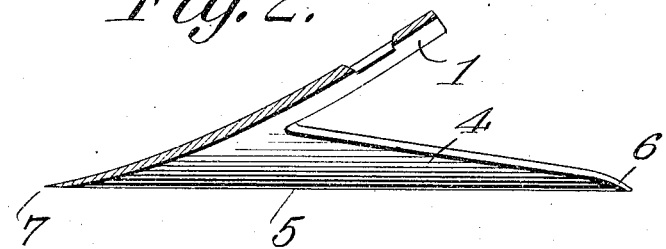
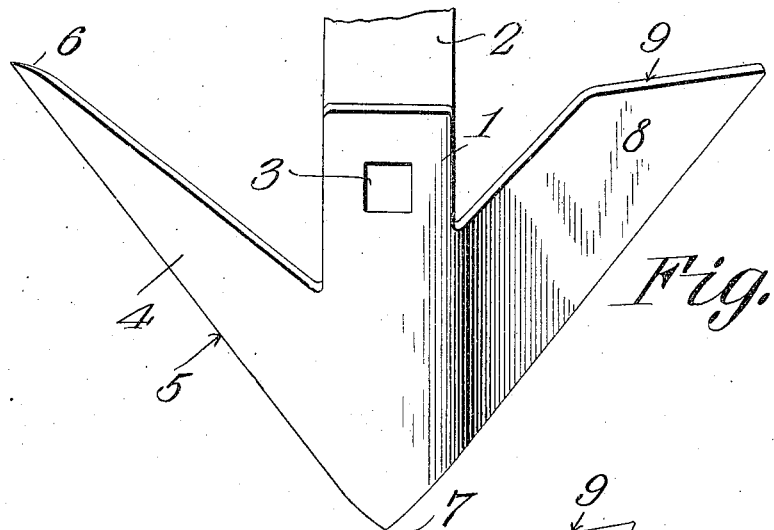
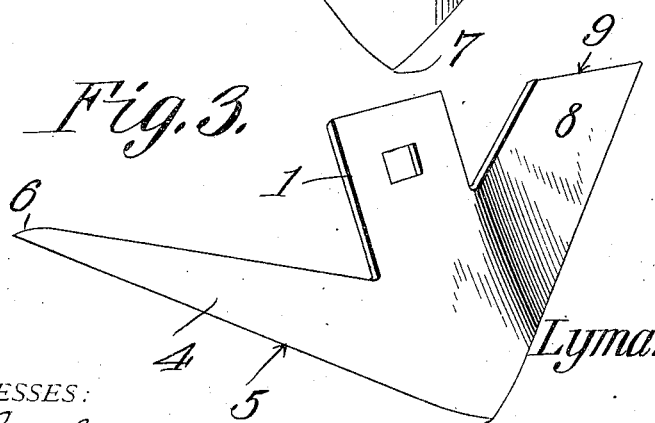
Lyman J. Gilman,
INVENTOR.

UNITED STATES PATENT OFFICE.

LYMAN J. GILMAN, OF PINEMOUNT, FLORIDA.

PLOW.

No. 846,789.  Specification of Letters Patent.  Patented March 12, 1907.

Application filed November 9, 1906. Serial No. 342,648.

*To all whom it may concern:*

Be it known that I, LYMAN J. GILMAN, a citizen of the United States, residing at Pinemount, in the county of Suwanee and State of Florida, have invented a new and useful Plow, of which the following is a specification.

This invention has relation to plows; and it consists in the novel construction and arrangement of its parts, as hereinafter shown and described.

The object of the invention is to provide a plow especially adapted for removing weeds and foreign vegetation from rows of young plants, such as cotton, pinders, &c., without injuring or disturbing the said plants. The plow consists, primarily, of a blade having a shank, by means of which it is attached to the plow-foot. At one side of the shank is a cutter, which is broader at its inner end and gradually tapers toward its outer end, which is rounded. The said cutter is disposed toward the row of plants when the plow is in operation. At the opposite side of the said shank is a sweep or gopher. The said sweep or gopher is broader at its inner end than the cutter and tapers slightly at its upper edge toward its outer end. The outer end of the said sweep is inclined at an angle to the upper and lower edges thereof. The sweep is intended to shunt the vegetation and trash removed from the plants toward the center of the row.

In the accompanying drawing, Figure 1 is a top plan view of the plow. Fig. 2 is a vertical sectional view of the same, and Fig. 3 is a perspective view of the plow.

The plow comprises the shank 1, which is secured to the plow-foot 2 by means of the bolt 3. The cutter 4 extends from one side of the shank 1 and is inclined forwardly at its lower edge and rearwardly at its outer end. The lower edge 5 of the said cutter 4 is comparatively sharp. The cutter is of greatest breadth at the point where it joins the shank 1 and gradually diminishes in breadth toward its outer end, which is curved, as at 6, in order to escape the growing plants and at the same time to permit the said cutter to be worked in close proximity thereto. The forward tip of the shank 1 is pointed, as at 7, and the sharpened edge 5 is continuous from the point 7 to the end of the cutter 4.

The sweep or gopher 8 extends from the opposite edge of the shank 1 and is provided with the lower cutting edge 9, which is also continuous from the point 7 to the end of the gopher. The inner portion of the gopher 8 is of greater breadth than the inner portion of the cutter 4—that is to say, the upper edge of the gopher 8 is higher than the upper edge of the said cutter. The gopher is of greatest breadth at the point where it joins the shank 1 and decreases slightly in breadth toward its outer end, the edge of which is pitched at an angle to the upper and lower edges of the gopher, as at 9'. The lower edge of the gopher is inclined forwardly, and its outer end is inclined rearwardly.

As the implement is drawn along a row of plants the cutting edges 5 and 9 (which are substantially horizontal) sever the foreign vegetation which is worked toward the gopher and over the edge of the same and beyond the end of the same. The area of the gopher being greater than the area of the cutter 4, the weight of the material from the gopher has a tendency to maintain the plow in proper alinement with relation to the plant. When a growing crop is freed of foreign vegetation with a plow, as above described, a vast amount of subsequent hoeing is avoided, for the reason that the peculiar-shaped cutter may be worked in very close proximity to the plants without disturbing or injuring the same.

Having described my invention, what I claim as new, and desire to secure by Letters Patent, is—

A plow comprising a shank, a cutter extending from one side thereof and being inclined forwardly at its lower edge and rearwardly at its outer end, said cutter being of greatest breadth at its point of juncture with the shank and gradually decreasing in breadth toward its outer end which is rounded, a sweep extending from the opposite edge of the shank and being of greatest breadth at its point of juncture with the shank and decreasing in breadth toward its outer end, the sweep being of greater area than the cutter, the lower edge of the sweep being inclined forwardly and its outer end inclined rearwardly.

In testimony that I claim the foregoing as my own I have hereto affixed my signature in the presence of two witnesses.

LYMAN J. GILMAN.

Witnesses:
T. E. DAUGHTY,
J. M. N. PEACOCK.